INVENTOR
Frederic W Hild

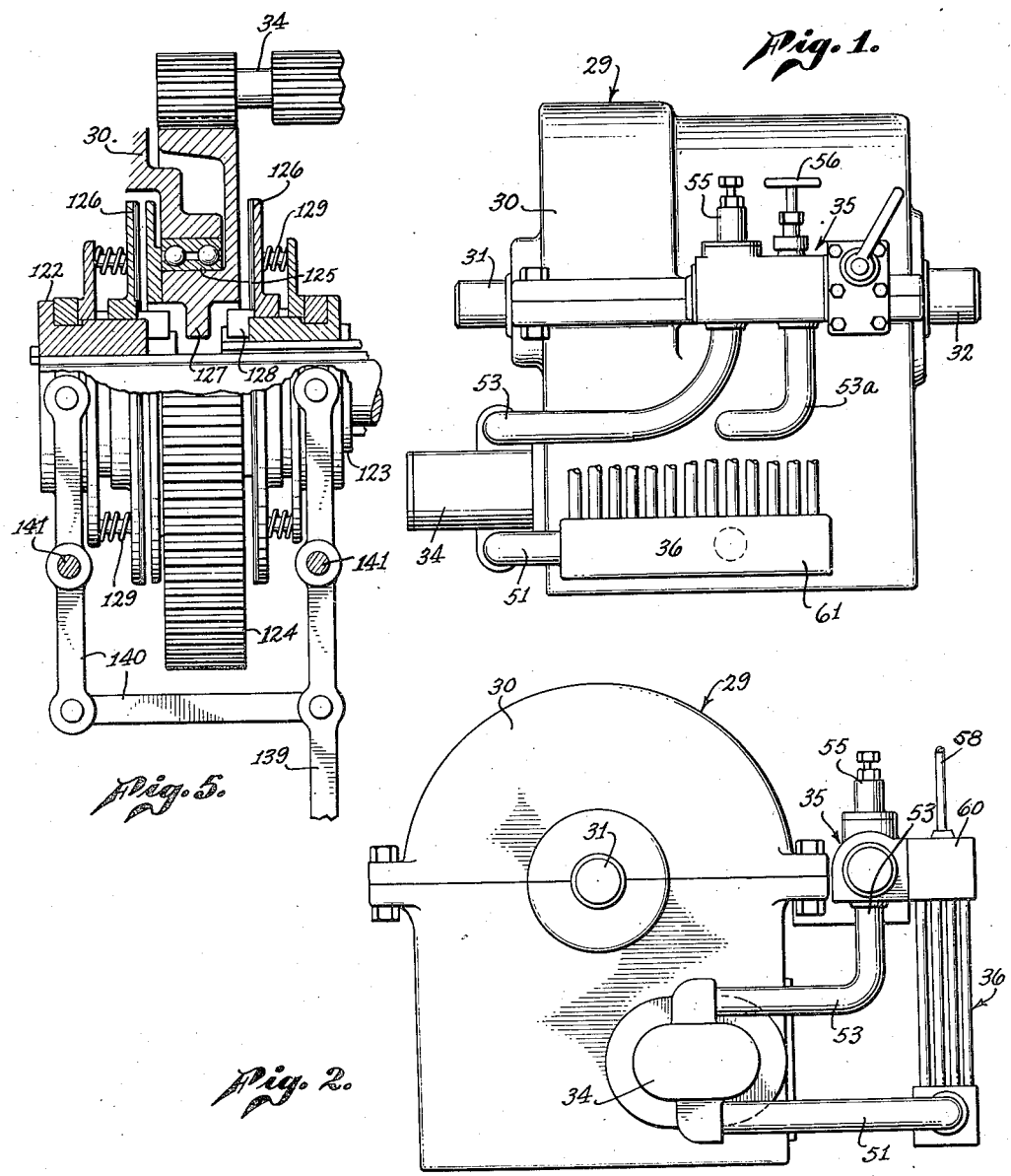

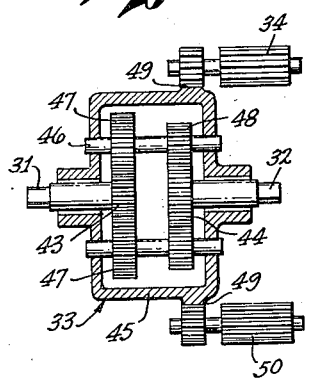
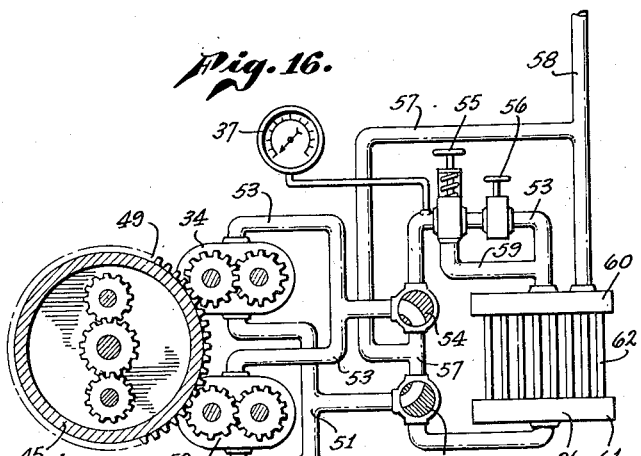
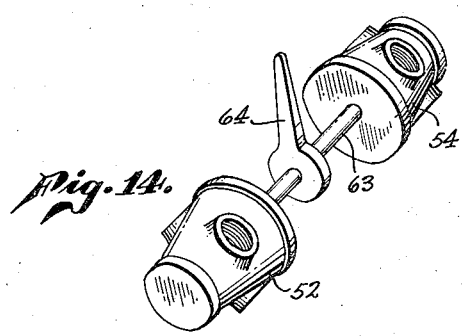
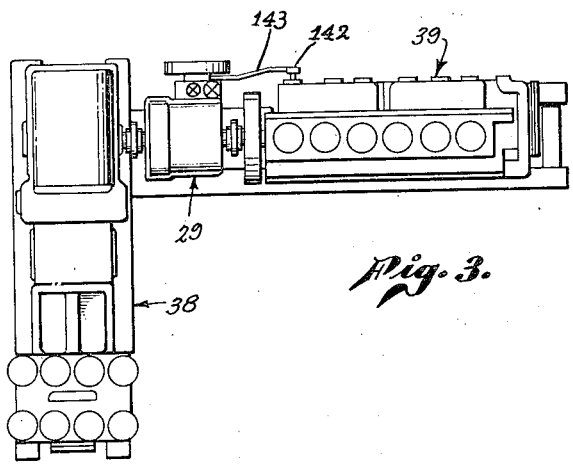

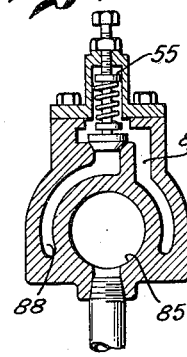
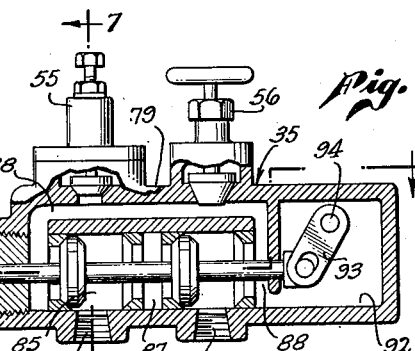
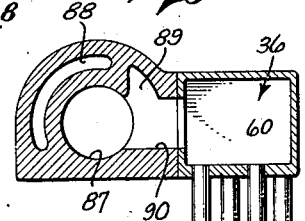
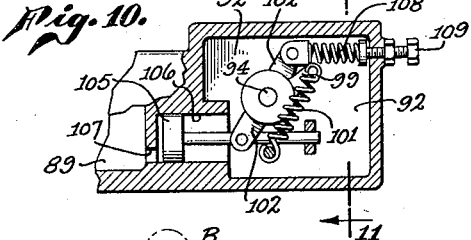
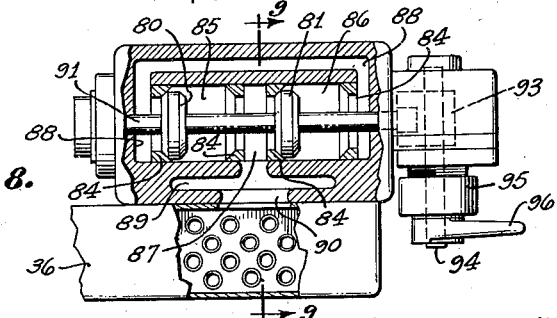
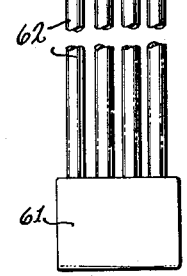
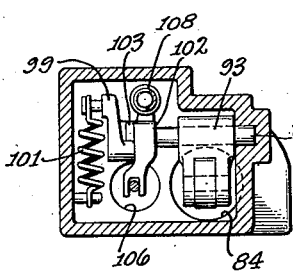
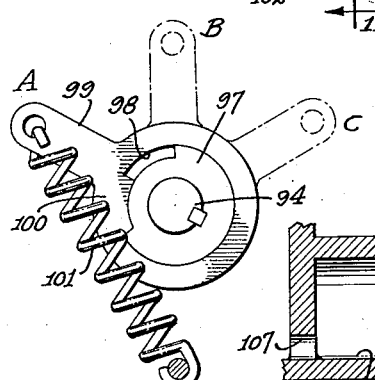
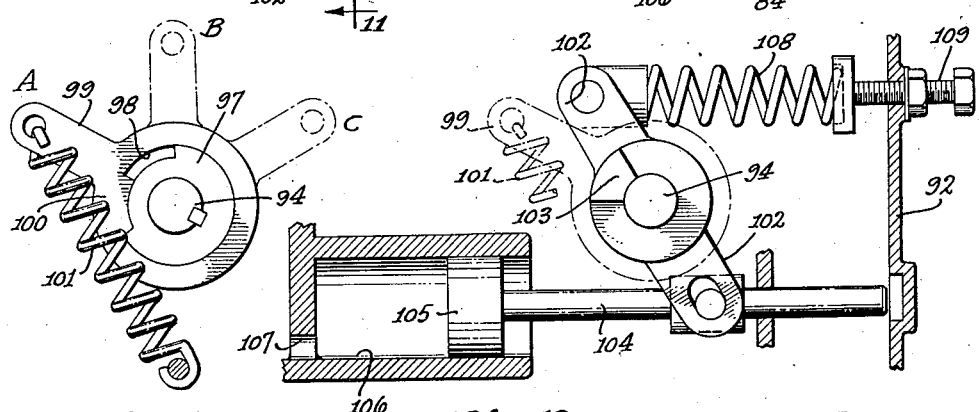

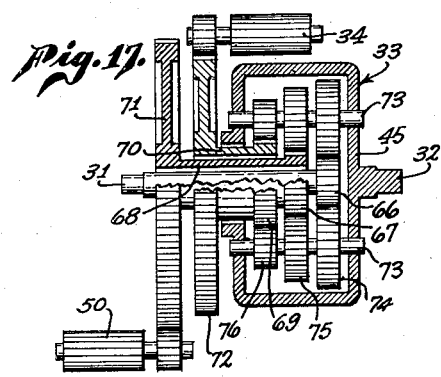
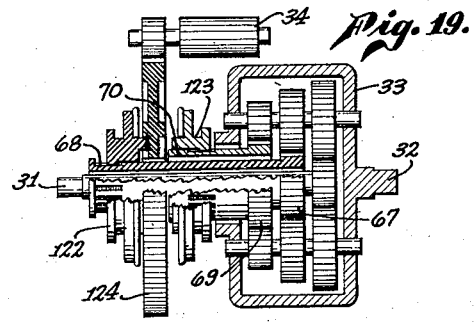
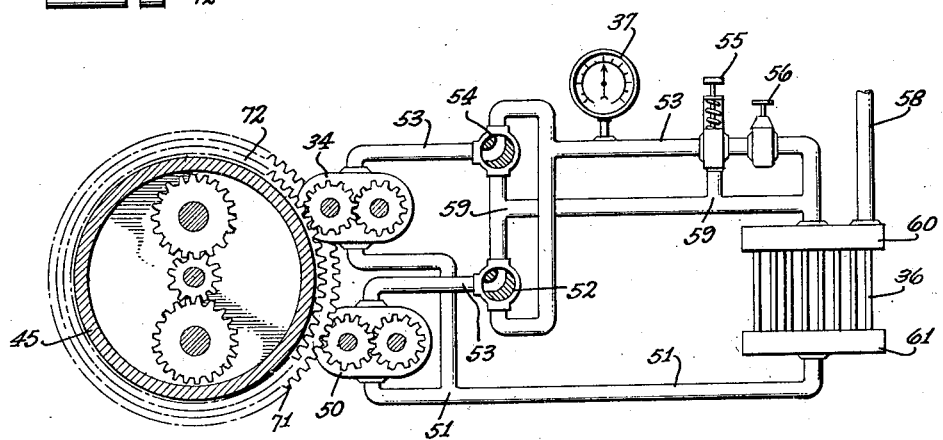
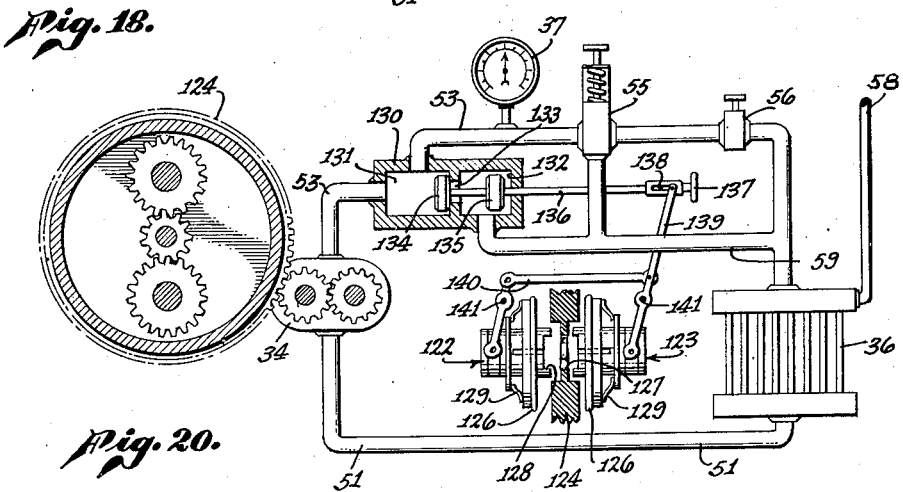

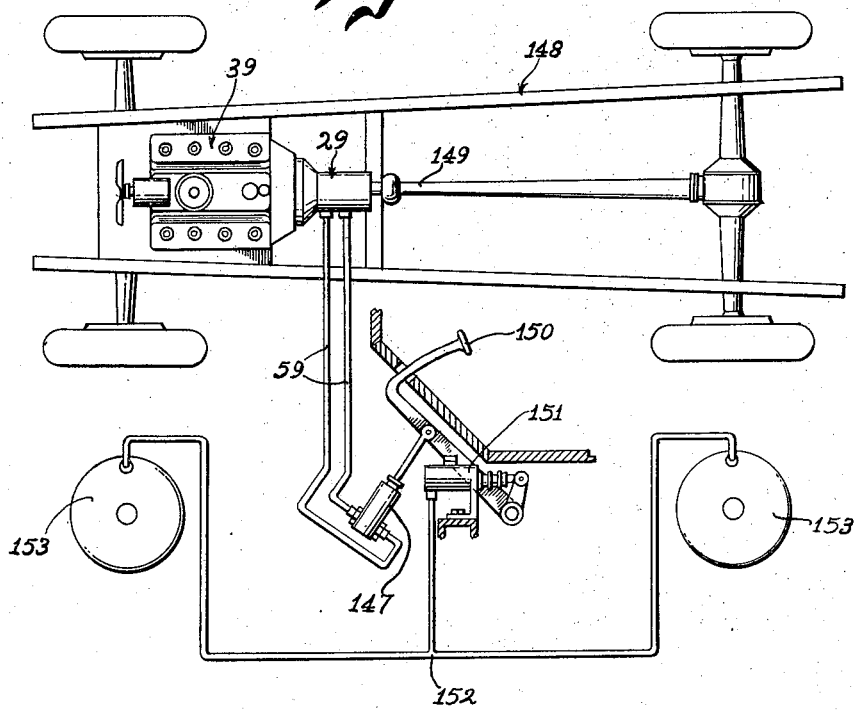
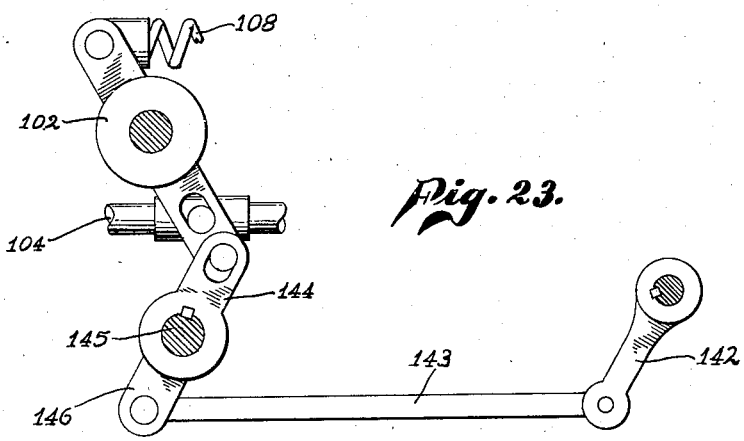

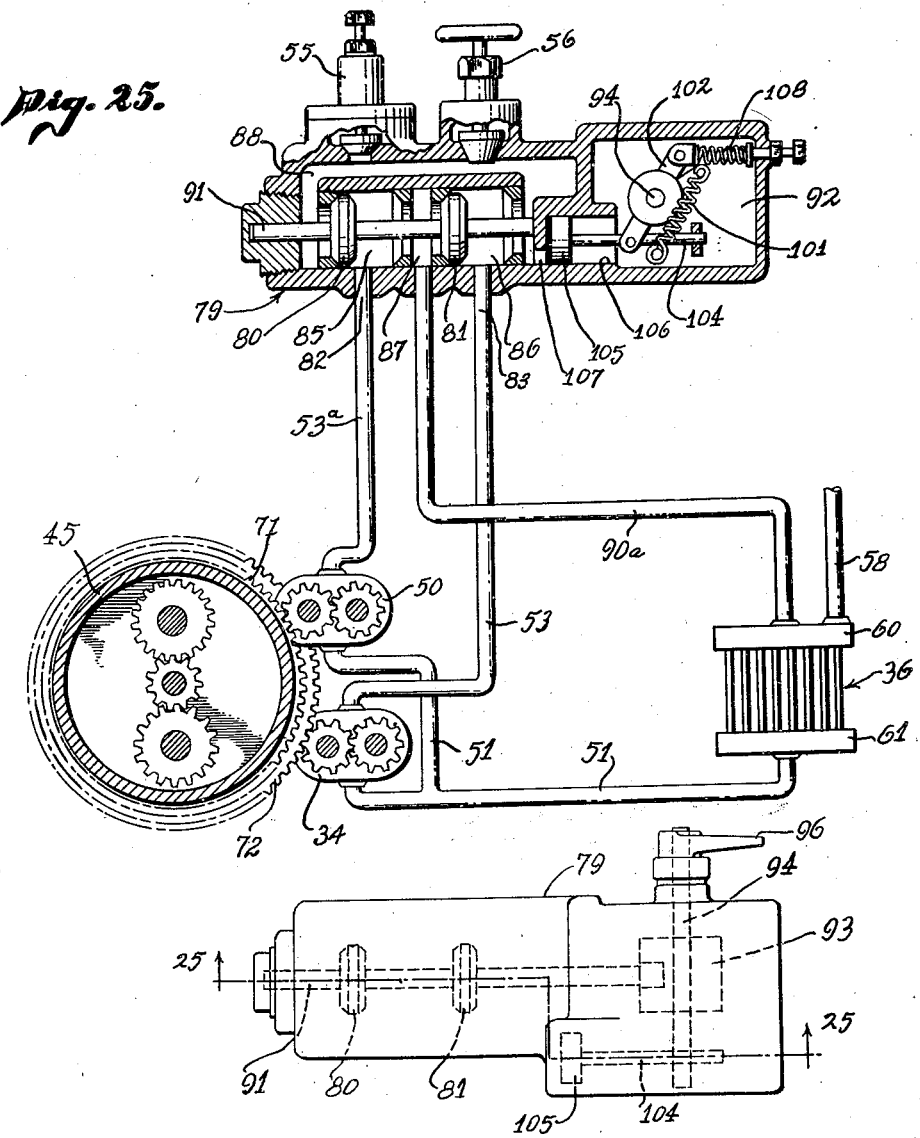

Patented June 16, 1942

2,286,485

UNITED STATES PATENT OFFICE 2,286,485

HYDRAULIC GEAR TRANSMISSION

Frederic W. Hild, Los Angeles, Calif.

Application November 20, 1939, Serial No. 305,325

24 Claims. (Cl. 74—293)

My invention relates to variable speed and variable torque hydraulic gear transmission and may be used in a wide variety of industrial and motor vehicle services. The form of the invention herein disclosed is a simple, compact device comprising planétary gearing hydraulically controlled, one of its objects being to transmit power from any type of engine or motor and to transform the natural speed torque characteristic of the motive power to one of greater flexibility and conformability to the driven load.

Thus the invention provides speed characteristic from zero to maximum through infinite graduations, for any torque within the capacity of the engine. Likewise it provides torque characteristic from zero to maximum of the engine capacity through infinite graduations, and the speed of the motive power may be fixed or constant as the synchronous electric motor, or may be any other speed of the engine characteristic. Moreover, the speed torque relations, mathematically considered are maintained in the first power, and therefore the invention imposes no adverse change of operation on the driven load or work device, but on the other hand provides numerous advantages and benefits as hereinafter shown.

In the fluid coupling and the hydraulic torque converter, the torque varies substantially as the square of the speed so that a small increase of torque is accompanied by a large decrease of speed. This characteristic is transmitted to the driven load irrespective of the gearing and the type of engine or motor, and necessarily affects the operation of the driven load or work device. In some applications this is seriously disadvantageous.

It is an object of the invention to provide an hydraulic transmission in which the speed-torque characteristic is a straight line function, and providing smooth, gradual variation of either speed or torque or both from zero to maximum and vice versa.

Another object of the invention is to provide an hydraulic variable gear transmission having means for measuring and indicating torque, so that the transmission serves as a continuous torsion dynamometer.

Another object is to provide a variable gear transmission having a plurality of specific gear changes, said transmission having hydraulic means for effecting the changes without either jaw clutches or friction clutches.

Automatic gear shift devices have been proposed, and, as far as this applicant is aware, all are based on change of speed. But the speed change of an engine is the resultant of the torque on it, that is, such devices are predicated on the effect and not on the cause, and regulation thus based always fails to achieve the desired action and usually results in unsatisfactory operation.

But automatic gear change based on torque correctly meets the requirements. Hence an important object of the invention is to provide an hydraulic variable gear transmission having a plurality of gear changes and having means for automatically effecting said changes, in accordance with the torque on the transmission, and independently of speed variations.

The present invention provides simple means for equally apportioning among several engines or motors, a common load such as long conveyor drive, printing press, drawworks drive of oil well drilling and others. This is readily accomplished by the hydraulic portion of the present invention and the adjustment is closely and easily made by a simple throttle valve.

The invention herein disclosed is an improvement of my invention described in Patent No. 2,136,356 for Drilling controls issued to me on November 8, 1938.

Other objects and advantages will appear upon consideration of the drawings and the accompanying description.

Figures 1 and 2 are respectively side and end elevations of the variable speed-torque transmission embodying the invention.

Figure 3 shows an embodiment of the invention in an industrial application in which the variable speed-torque transmission of Figures 1 and 2 is interposed between a motor or engine and a work device.

Figure 5 is a partial view showing another arrangement for effecting two specific gear changes.

Figures 6, 7, 8, and 9 illustrate a hand operated valve control mechanism for the circulatory system: Thus:

Figure 6 shows the valve mechanism in part vertical section.

Figure 7 is a section on the line 7—7 of Figure 6.

Figure 8 is a part horizontal section on the line 8—8 of Figure 6 and shows a portion of the cooling radiator.

Figure 9 is a section on the line 9—9 of Figure 8.

Figures 10, 11, 12, 13 illustrate partly in diagram the automatic hydraulic control of the valve mechanism of Figure 6, thus:

Figure 10 shows in part vertical section the automatic control.

Figure 11 is a section on the line 11—11 of Figure 10.

Figure 12 shows the hydraulic piston control and regulator of Figure 10.

Figure 13 shows the spring snapover for quickly moving the three-way twin valves.

Figure 14 shows a pair of rotary valves for joint operation.

Figures 15 to 21 inclusive show diagrammatically and variously the variable speed gear unit and the fluid circulatory system; thus:

Figure 15 shows the gear unit having a specific gear reduction.

Figure 16 is a diagram of the circulatory system for Figure 15.

Figure 4:
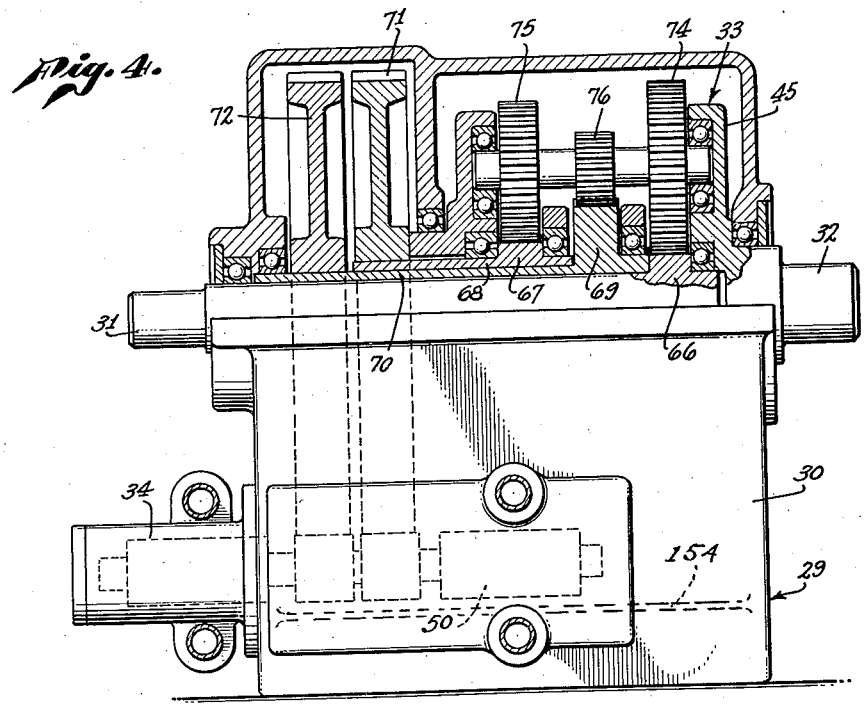
Figure 4 shows in part section the transmission having two specific gear changes.

Figure 17 shows diagrammatically the gear change unit of Figure 4.

Figure 18 is a diagram of the circulatory system for Figures 4 and 17.

Figure 19 shows diagrammatically the two change gear unit of Figure 5.

Figure 20 is a diagram of the circulatory system for Figure 19.

Figure 21:
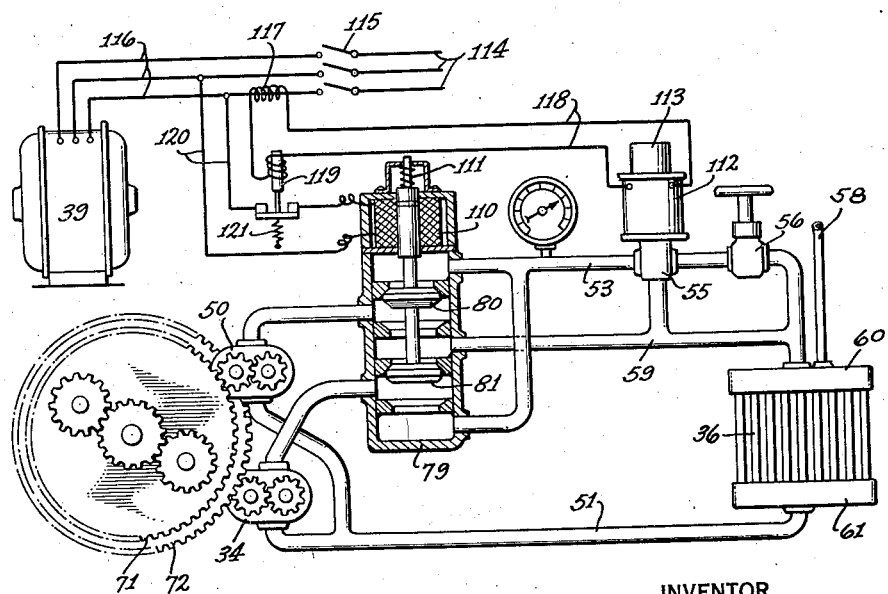

Figure 21 is a diagram of the invention for electric motor drive.

Figure 22 shows the variable speed transmission in an automobile.

Figure 23 shows automatic control of fuel supply to the engine of Figure 3.

Figures 24 and 25 show in diagram the circulation system for Figure 17 utilizing the automatic valve mechanism of Figures 6 to 13 inclusive.

Referring to the drawings and particularly to Figures 1 and 2 the invention may be represented by the variable speed transmission 29 comprising in unitary assembly gear case 30, having a pair of axially aligned shafts 31 and 32 for input and output or vice versa respectively, on which are mounted planetary gearing 33 and one or more spur gears as later described, a circulatory system comprising one or more positive displacement rotary pumps driven by one or both of said spur gears, one of the pumps being designated by the numeral 34, a valve mechanism 35, a cooling radiator 36, and fluid pressure gauge 37.

In Figure 3, the output shaft 32 of the transmission 29 is connected by a coupling to the work device 38 and the input shaft 31 is connected by another coupling to the engine or motor 39, which may be the constant speed type such as Diesel engine or simple induction motor.

Referring to Figures 15 and 16, the planetary gearing 33 includes the sungears 43 and 44 on the shafts 31 and 32 respectively, the two sungears differing in diameter so as to provide substantial ratio of gear change. The planetary housing 45 is rotatable with respect to the shafts 31 and 32 and carries the pinion shafts 46 and the planetary pinions 47 and 48, each pinion shaft and its pinions constituting one piece. The pinions 47 and 48 mesh with sungears 43 and 44 respectively. On the perimeter of the planetary housing 45 are teeth forming the spur gear 49 which mesh with the drive pinions of a pair of gear pumps 34 and 50 respectively.

Considering now the circulatory system, the conventional radiator 36 has upper tank 60 and lower tank 61 connected by tubes 62. The two pumps are connected to the radiator in parallel, both pumps drawing liquid (oil) from the lower tank 61 through suction piping 51 in which is three-way rotary valve 52. The pumps discharge through piping 53 which conducts the oil to the upper tank 60. The discharge pipe 53 has the three-way valve 54, torque relief valve 55 and throttle valve 56. Also connected with the pipe 53 is pressure gauge 37. The third ports of the three-way valves 52 and 54 are connected by piping 57 to each other and to atmospheric vent pipe 58 of the radiator. A by-pass pipe 59 conducts the discharge of the torque relief valve 55 to the radiator.

Referring to Figure 14 the three-way valves 52 and 54 are operated in unison by the common stem 63 and the common handle 64.

In operation assume input shaft 31 to be driven at constant speed, for example, by engine 39, and that output shaft 32 is connected to work device 38. The sungear 43 will drive through the planetary pinions 47 and 48 to the sungear 44. If the planetary housing 45 be held stationary then the sungear 44 and output shaft 32 will be rotating at their maximum speed and drive the work device at like speed. This is the condition when throttle valve 56 is closed, the positive displacement pumps 34 and 50 holding the planetary housing stationary. The torque demanded by the work device is translated to hydraulic pressure at the pump and indicated by the pressure gauge 37. Thus the device may serve as a torque dynamometer.

Upon opening the throttle valve 56 slightly and permitting correspondingly slight circulation of the oil, the two pumps begin to rotate permitting the planetary housing 45 to rotate likewise, wherefor the speed of output shaft 32 and work device 38 is diminished correspondingly. Upon opening the throttle valve more and more, the circulation of the oil increases, the speed of the pumps and the planetary housing 45 increases, whereupon the speed of the output shaft 32 and work device 38 decreases correspondingly, until at full opening of the valve, the speed of the pumps and the planetary housing and the circulation of the oil respectively are maximum; the hydraulic pressure of the pumps and the torque to the work device are then minimum and negligibly small. Hence the shaft 32 and the work device are at zero speed, i. e. are stationary and in effect declutched from input shaft 31 and engine 39. Conversely, by moving the throttle valve toward closure, the work device may be brought from rest to full speed or to any intermediate speed, gradually, smoothly and without shock.

Occasionally, lengthy piping and other factors of the circulatory path may create appreciable flow resistance even with the throttle valve 56 wide open, and at the same time the friction of the work device at rest may be very small relative to this flow resistance. In such event there might be some "drag torque" sufficient to cause "creeping" of the work device. To meet this condition the three-way valves 52 and 54 may be rotated to open into piping 57, this will result in the discharge from the two pumps by-passing the other valves, the radiator and much of the piping, so that the circulatory path will be greatly shortened and the flow resistance materially reduced; moreover the suction and discharge lines may be opened to the atmosphere. Consequently, "drag torque" and "creeping" of the work device will be eliminated.

Considered as clutching or braking means, any plurality of pumps may thus operate in parallel through a common circulatory path and exert on a rotatable element of the transmission, a like plurality of restraining forces which are inherently equalized on the element. Furthermore the width of gear 49 and the pump sizes may be smaller than if a single pump were used.

At any point of the speed range below that due to closed throttle 56, whether that valve is open little or much, the circulating oil provides an hydraulic cushion so that the device will absorb torsional vibration and shocks due to the operation of the engine and/or the work device. This may eliminate pulleys and V belts currently deemed necessary in certain service, an example being the mud pump drive for rotary drilling, which is subject to the torsional unevenness of the crank shaft operation and to shocks encountered during pumping. For such service the motor and the transmission 29 may be coupled to the work device as shown in Figure 3.

Another advantage very useful in applications requiring two or more engines or motors for driving a common load shaft or a common work device, is the simplicity and ease with which the transmission 29 enables equalized apportionment of the power flow by the several engines or motors. The correct apportionment is very readily made by adjusting the throttle valve 56 of each drive unit in accordance with the indications of the gauge 37. Examples of such applications are long conveyor drives which may require as many as six or more motors. Another is in oil well drilling in which two Diesel engines are frequently needed to drive the drawworks when hoisting the heavy drill string.

The torque relief valve 55 which is adjustable and may be the same as shown by Figure 8 of my aforesaid Patent No. 2,136,356 establishes any predetermined limit of torque to the work device without interrupting the power flow, and it permits the work device to stall without also stalling the engine. This characteristic is very desirable in many industrial applications, as for example the work device 38 may be assumed to be the mud pump for rotary drilling encountering sticky digging in clay formations that produce restriction to the mud circulation which may lead to a plugged bit. In order to protect the equipment and keep the engine or motor from stalling, the torque to the pump should have definite limit. Current practice provides a by-pass valve in the pump line which shears a nail upon attaining the limit of pump pressure, or a circuit breaker for the electric motor if the latter be the motive power, but when either of these cut-outs acts, the pumping stops just when pressure and circulation are most urgently needed. But with transmission 29 hereof, the mud pump 38 may be driven at any desired speed and when the predetermined limit of torque overload is reached, the torque valve 55 opens slightly, the mud pump then may run at reduced speed at the limit of torque, if the mud flow passage is still open. Should the mud flow path be closed as by a plugged bit, the torque valve opens somewhat more, the mud pump 38 stalls but the engine 39 continues running and delivers torque through transmission 29 to the mud pump, thus acting to clear the plugged passage.

Referring to Figures 4, 17, and 18, these show the transmission 29 having two specific gear changes. The planetary gearing 33 includes three sun gears, namely sun gear 66 integral with shaft 31, sun gear 67 integral with sleeve 68, and sun gear 69 integral with sleeve 70 all in concentric relation. Output shaft 32 is integral with planetary housing 45. Rigidly mounted on sleeve 68 is gear 71 as though integral therewith. Likewise gear 72 is mounted on sleeve 70. On the planetary shafts 73 and integral therewith are planetary pinions 74, 75 and 76 which mesh with sun gears 66, 67 and 69 respectively. All of the shafts, sleeves and the planetary housing are in the gear case 30 and rotatably mounted on suitable ball bearings.

Considering the circulatory system, the pump 34 meshes with gear 72 and pump 50 meshes with gear 71. The suction lines 51 from lower tank 61 of radiator 36 to the two pumps have no valve. Both pumps discharge through high pressure piping 53 to the upper tank of the radiator, the piping having three-way rotary valve 54 specifically for pump 34, and three-way valve 52 specifically for pump 50. The piping 53 also has torque valve 55 and throttle valve 56 for the common control of both pumps. The third ports of the three-way valves 52 and 54 are connected to each other and to the radiator by piping 59 which also connects to the torque valve 55, the piping 59 thus constituting the low pressure and by-pass line.

In operation, the pump 50 is discharging through the low pressure line 59 with only negligible torque at gear 71. Pump 34 is discharging through high pressure line 53 with throttle valve 56 wide open, there is likewise only slight torque at gear 72. So with input shaft 31 at full speed, all of the gears and pinions of transmission 29 are rotating with only slight, negligible torque on planetary housing 45, hence output shaft 32 and work device 38 are stationary. Upon moving throttle valve 56 toward closure the pump 34 slows down, exerting restraining force on gear 72 and sungear 69 which likewise slow down; torque is thereupon applied to planetary housing 45, which may drive and rotate the work device 38 of Figure 3. The pump 50, gear 71 and sungear 67 meanwhile continue rotating idly at full speed, that is, the pump 50 circulates oil at practically zero pressure.

The planetary gearing combination of sun gears 66 and 69 with their respective pinions 74 and 76, as indicated by their diameters provide the slow speed-high torque drive to shaft 32; or conversely, the high speed drive if shaft 32 were input and shaft 31 were output.

Upon rotating the three-way valves as by the handle 64, the pump 34 discharges through the low pressure line to the radiator 36, and pump 50 discharges into high pressure line 53 to the closed valve 56. Thereupon pump 34, gear 72, and sun gear 69 rotate idly exerting no torque, while pump 50, gear 71 and sun gear 67 come to stoppage, so that planetary housing and work device 38 rotate at the highest speed of the transmission 29. Thus gear pump 34 controls the low speed-high torque gear combination, and gear pump 50 controls the high speed-lower torque combination.

Should the load of the work device 38 increase so as to require the low speed-high torque combination (the torque guage 37 would indicate this) then by merely rotating the valves 52 and 54 back to the first position, the desired combination is effected. The changes back and forth can be effected automatically in response to the torque demand of the work device irrespective of the speed of either the engine or the work device, as hereinafter shown.

Referring now to Figures 1, 2, 4 and 6 to 13 inclusive and 17, 18, 24 and 25:

The valve mechanism 35 comprises in compact unitary assembly, the valve box 79 on which are mounted the torque valve 55 and throttle valve 56, and containing the twin valves 80 and 81, which with their respective valve chambers form three-way valves corresponding in function to the rotary valves 52 and 54 respectively, that is, valve 80 controls pump 50 and the high speed-low torque gear combination, 71 and 67, and the valve 81 controls pump 34 and the low speed-high torque gear combination 72 and 69. Secured to the side of the valve box is the upper tank 60 of radiator 36 and from the lower tank 61 of the radiator two short pipes 51 provide the suction lines to the pumps 34 and 50. A short pipe 53 leads from the discharge outlet of pump 34 to inlet 83 and valve chamber 86 of the valve box 79 and another short pipe 53a leads the discharge from pump 50 to inlet 82 and valve chamber 85 of the valve box. The valve mechanism 35 may be secured to the gear case 30 close to the pumps 34 and 50. Thus the variable speed hydraulic transmission 29 is a compact unit having a very short fluid circulatory path, and as the fluid passages in the valve mechanism 35 are short and ample, the flow resistance of the circulatory path is very slight.

The valve box 79 is cored to provide several compartments and channels of which the central compartment contains the valve seats 84 that form the valve chambers 85 and 86 and the intermediate low pressure discharge chamber 87 between the valve chambers; both valve chambers may discharge into the intermediate chamber. Partially surrounding one side and both ends of the central compartment is the high pressure channel 88; and on the opposite side is low pressure channel 89, the two channels being separated from each other by suitable partitions.

The low pressure chamber 87 opens into low pressure channel 89 which in turn discharges through opening 90 into the upper tank of radiator 36. Both valve chambers 85 and 86 discharge into high pressure channel 88 which in its upper portion has two valve seats, one for torque valve 55 and the other for throttle valve 56. Both valve seats open into low pressure channel 89.

The two valves 80 and 81 are of the disc type and mounted on sliding valve rod 91, which extends into operating chamber 92. The rod is movable lengthwise by lever 93, which is keyed to rock shaft 94. The rock shaft extends to the outside of chamber 92, through a conventional packing 95 and is secured to operating handle 96.

In Figures 6, 8 and 25, the valve 80 is in valve chamber 85 and shown closing the discharge to high pressure channel 88. The valve 81 is in valve chamber 86 and shown closing the discharge to the intermediate or low pressure chamber 87. Thus the pump 50 is discharging oil through pipe 53a, inlet 82, valve chamber 85, intermediate chamber 87, thence through low pressure channel 89 and opening 90 (pipe 90a for Figure 25) into the upper tank 60 of the radiator, thence down the cooling tubes into the bottom tank 61, the oil flowing therefrom through suction line 51 to the suction inlets of the pumps; hence the gear 71 and sun gear 67 are rotating idly exerting no torque. At the same time the discharge of pump 34 is through pipe 53, inlet 83, valve chamber 86 into high pressure channel 88. The throttle valve 56 being closed there is no circulation of oil and hence the pump 34 holds the gear 72 and sungear 69 stationary, and the transmission 29 is driving in its low speed-high torque combination.

Upon moving the twin valves 80 and 81 into their opposite seats in their respective valve chambers, then pump 34, gear 72 and sungear 69 run idly, while pump 50, gear 71 and sungear 67 are brought to stoppage; that is, the high speed-lower torque combination of transmission 29 is driving the work device. If the throttle valve 56 be gradually opened, the oil will discharge from the high pressure channel 88 into low pressure channel 89 and the speed of the work device may be brought gradually to zero. Then both pumps and their respective gears and sungears will be rotating idly and the work device is declutched from the motive power. Thus the transmission 29 provides a plurality of gear combinations having different ratios, each combination providing a different torque ratio between the input and output shafts of the transmission and the speed of each combination may be varied gradually and smoothly through the full range between zero and their respective maximums.

Referring to Figures 24 and 25, the three-way valves 80 and 81 may be moved automatically irrespective of speed variation thereby effecting the gear changes automatically according to predetermined torque on the engine or the work device, independently of the speed of either the engine or the work device. In Figures 10 to 13 inclusive, the operating chamber 92 of valve box 79 contains the snap-over and control members, of which intercepting collar 97 is keyed to rock shaft 94. The collar on its circumference has a slot 98 adapted for receiving a tooth or jaw of another member the sides of the slot forming intercepting jaw faces. Rotatably mounted on the collar is snap-over lever 99 which has an inwardly projecting tooth 100 one-half as wide as slot 98 into which the tooth extends, so that the lever 99 may move from position A to center position B before it intercepts the collar. Continued movement of lever 99 past the center position B causes spring 101 to pull the lever ahead to position C, the lever thereby rotating the collar 97 and rock shaft 94.

In order to rotate the snap-over lever 99, the control lever 102 is rotatably mounted on the rock shaft next to the lever 99 both levers having intercepting jaws, of which the jaw 103 of control lever 102 is one-half as wide as the receiving slot of snap-over lever 99. The lower end of control lever 102 engages the shaft 104 of piston 105 which is in cylinder 106. The cylinder is open to operating chamber 92, the other end of the cylinder communicates at opening 107 with low pressure channel 89. The upper end of control lever 102 is engaged by the torque regulating spring 108 which may be adjusted by screw 109.

Remembering that the fluid pressure in compartment 92 is always proportional to the torque of the work device, and assuming that in Figures 12 and 13, position A represents the high speed gear combination, position C represents the low speed-high torque gear combination and position B represents dead center for snap-over lever 99, then increasing torque causes increasing fluid pressure which urges piston 105 farther into the cylinder 106 and thereby causes piston rod 104 to rotate the control lever 102 from position A toward center position B, the movement being opposed by the spring 108. The lever 102 carries with it the snap-over lever 99 by means of the intercepting jaws of both levers until lever 99 just passes the center position B whereupon the snap-over spring 101 pulls the snap-over lever 99 ahead of the control lever 102. This action causes lever 99 to rotate the collar 97 and rock shaft 94, thereby rotating the operating lever 93 and moving the twin valves 80 and 81 to the position shown in Figures 6, 8, 10 and 25, which as previously explained is the position for the low speed-high torque gear combination. Conversely, when the torque decreases, the fluid pressure likewise decreases, with correspondingly less piston force, so that the torque regulating spring 108 urges the control lever to rotate in the other direction until the snap-over lever is again in position A. That is, the high speed gear combination of the transmission is again in operation, and driving the work device. The arrangement for automatic operation just described readily permits manual operation by the handle 96 without any change of the mechanism, so that either mode of operation may be employed optionally.

Figure 21 shows an electrical arrangement for automatically effecting the gear changes of transmission 29 independently of speed variations of either the motor or the work device. The motor 39 may be the synchronous type or a squirrel cage induction motor. The hydraulic circulatory system is substantially the same as shown by Figure 18, except that valve box 79 has (in lieu of operating compartment 92 and the contained parts) the solenoid magnet 110, the plunger of which operates the twin valves 80 and 81 against the pull of gravity and the force of a spring 111; and the torque valve 55 which is operated by solenoid magnet 112, against spring 113 in housing.

A source of electricity supply 114 provides electric energy through a switch 115 to motor leads 116 in one of which is a current transformer 117. The wires 118 connect the torque valve magnet 112 and the magnet coil of an electro-magnetic switch 119, to the current transformer all in series relation. The switch contact members are in the circuit of wires 120 which connect the valve box magnet 110 in parallel relation to a pair of the motor leads 116. The magnet coil of switch 119 closes the switch contacts against the force of spring 121.

The torque valve 55 is intended to open only for the predetermined highest safe or practical limit of torque on the apparatus; and, as the current (amperes) of the motor is proportional to the torque, the magnet 112 and the spring 113 in housing are selected and adjusted accordingly.

When the twin valves are in the position shown in Figure 21, the low speed high-torque gear combination is effective, that is, when the torque had become too high for the high speed gear combination. Manifestly, the torque for the transition from high to low gear is considerably less than the limiting torque for torque valve 55. Accordingly the electro-magnet switch 119 which is normally open, is adjusted to close the circuit to valve box magnet 110 when the current through the switch coil corresponds to the torque of transition from high to low gear.

In operation assume the main line switch 115 closed, the motor 39 and transmission 29 running and the throttle valve 56 wide open. The work device 38 is then declutched and at rest, and the load on the motor is slight. The electro-magnet switch 119 is then open, the magnet 110 is de-energized and the twin valves are in the down position in valve box 79, that is the high speed gear combination is in effect.

If the work device is of the type that requires considerable torque to start it, as in the case of an electric vehicle on an up-grade, or an oil well drawworks about to hoist a heavy drill string, then with motor 39 at full speed and upon moving the throttle valve 56 toward closure, the torque of starting the load does not come onto the motor suddenly, but builds up gradually without shock or surge. If the torque increases to the transition point from high to low gear and the work device has not yet started, then the current (corresponding to the torque of transition) in magnet of switch 119 causes the switch contacts to close and energize the valve box magnet 110 whereupon the twin valves are lifted to the position shown by Figure 21 and the low speed-high torque gear combination is effective.

When the torque and correspondingly the motor current, diminish to the transition point for gear change, then the switch 119 opens, the magnet 110 is de-energized and the twin valves revert to their down position and the high speed gear is in operation and effect.

Figures 5, 19 and 20 show an arrangement in which the planetary gear change may be effected by one pump and one gear and a pair of synchro-clutches. Thus in lieu of the gears 71 and 72 of Figure 21, the sleeve 68 of sungear 67 has splined to it a synchro-clutch 122, and the sleeve 70 of sungear 69 has splined to it the synchro-clutch 123. A gear 124 is rotatably supported between the clutches on ball bearings 125 in the gear case 30, and meshes with the drive pinion of pump 34. The gear has side faces adapted for co-operation with friction discs 126 of the clutches, and between the side faces in the gear bore are jaws 127 which co-operate with jaws 128 of the clutches. When either clutch is moved to engage gear 124, the springs 129 between the clutch body and the friction disc 126, resiliently force the disc against the side face of the gear 124 for the purpose of bringing the gear and the sungear corresponding to the clutch, to the same speed before the clutch jaws 128 can engage the gear jaws 127.

A valve box 130 has two valve chambers 131 and 132 respectively, which communicate through their common valve opening 133 formed by their respective valve seats. Pipe 53 conducts the discharge from pump 34 into valve chamber 131 and from the same through the torque valve 55 and throttle valve 56 to the upper tank of the radiator. The valve chamber 132 is connected by low pressure, by-pass pipe 59 to the upper tank of the radiator. Twin valves 134 and 135 on valve rod 136 are in valve chambers 131 and 132 respectively, and control the common valve opening 133. The twin valves and the valve chamber 132 may be deemed a by-pass valve.

The valve rod 136 may be moved longitudinally by any suitable mechanism such as hereinbefore described, but for simplicity of the diagram, a knob or handle 137 is indicated. The valve rod has a longitudinal slot 138 to which the shift lever 139 is operatively connected, the shift lever forming part of the clutch shifting linkage 140. This linkage is the parallel motion type having two fulcrums 141, so that both clutches 122 and 123 may be moved in the same direction at the same time. The arrangement is such that upon moving the valve rod 136 to close the by-pass valve 132, then one of the clutches is moved into engagement with the gear 124 and the other clutch is moved away therefrom. When it is desired to free the engaged clutch from the gear 124, the slot 138 in rod 136 permits moving the twin valve to open the by-pass valve 132 before the shift linkage 140 is urged or acted upon to free the engaged clutch from gear 124. The open by-pass valve enables the pump to discharge freely and with negligible pressure through low pressure pipe 59 to the radiator, so that torque on the gear 124 is slight and the clutch may be easily freed from engagement therewith, irrespective of whether the throttle valve 56 be closed or open.

In operation, assuming the input shaft 31 driven at constant speed by engine 39 and that the twin valves 134 and 135 and the clutches 122 and 123 are in the position shown by Figure 20, then gear 124 and pump 34 are idle and stationary, irrespective of whether the throttle valve 56 be closed or open. There is then no circulation of oil, nor any hydraulic pressure in the circulatory system, no "drag" torque, and the output shaft 32 and the work device 38 are stationary.

Assume the throttle valve 56 is wide open; upon moving the twin valve 135 to close the bypass valve 132, the clutch 122 is moved into engagement with gear 124, the gear then being rotated by sungear 68 and the high speed gear combination is effective. The change from high to low speeds and vice versa may be made manually or automatically by operating mechanism previously described.

As previously pointed out, regulation based on an effect yields less satisfactory result than regulation based on the cause of the effect, and that in engines speed change is caused by torque. In engines using the conventional speed governor, the latter acts to change the fuel supply only after the speed has changed due to torque. But if the valve controlling the fuel supply is moved directly in response to torque change and before speed change, the regulation would be faster and closer.

By means of transmission 29 which is also a torque dynamometer, this closer regulation of the engine is readily effected. Referring to Figures 3, 12 and 23, the throttle lever 142 of the fuel valve of engine 39 is connected by a link 143 to a control member of the valve system of the transmission. This member may be handle 64 of the rotary three-way valves of Figure 14; or it may be the handle 96 of the valve mechanism 35. Thus when the torque gauge 37 indicates the need of gear change, or change of fuel supply to the engine, then movement of the handle or the throttle lever accomplishes both.

For automatic action, the link 143 may be actuated by lever 102 of Figure 12 in one of several ways. As shown in Figure 23, the lever 102 is operatively connected to another lever 144 which is keyed onto a rock shaft 145. The shaft passes through suitable packing in the side of compartment 92 extending to the outside thereof, and to the outer end of the shaft 145 is secured a companion lever 146 which in turn is connected to the link 143. Thus the lever 102 which is automatically moved in accordance with the torque imposed by the vehicle, correspondingly moves the throttle lever 142 of the engine fuel valve prior to speed change of the engine.

This feature of torque control independently of speed, enables transmission 29 to serve as a superior and unique braking or retarding means for slowing down the work device. Assuming that the fuel supply to the engine 39 has been diminished so that the engine is slowing down, then (Figure 18) by moving the rotary three-way valves 52 and 54 so that the discharge from both pumps 34 and 50 is throttled down, the restraining force of both pumps tends to oppose rotation of the planetary gearing 33, hence the output shaft 32 and the work device 38 are likewise slowed down.

Another way to accomplish the same result is by means of an additional valve 147 in the low pressure discharge line 59. Figure 22 shows this for the auto-vehicle 148 in which engine 39 and transmission 29 drive the propeller shaft 149, which in turn drives through the customary differential to the rear wheels of the vehicle.

The brake pedal 150 is operatively connected to the master piston 151 of the conventional hydraulic brake system which includes the tubing 152 and the wheel brakes 153. The pedal 150 is operatively connected also to the valve 147 which is in the low pressure pipe 59 of the circulating system of transmission 29. The valve 147 is of the piston plunger type which may throttle but not fully close pipe 59. The linkage connecting the master piston 151 and the plunger valve 147 to the brake pedal 150 is such, that on depressing the pedal, the valve 147 is moved into throttling position before the master piston moves sufficiently to apply the wheel brakes 153. Further depression of the brake pedal would not change the throttling position of the valve 147 but would apply the brakes.

The advantages are important: thus the transmission 29 can assume the major duty of retarding from the higher speed to lower speed, after which the wheel brakes would take hold and bring the vehicle to stop. When descending long grades, dependence upon the engine compression for retarding the vehicle is rarely adequate, so the brakes must be applied frequently; but here again, the transmission 29 can assume the severe duty of retardation without calling upon the brakes at all.

Referring to Figures 1, 2, 4, the cooling radiator 36 which serves as the reservoir for the circulating liquid, may in some applications be omitted, and in lieu thereof, the lower half of gear case 30 may be used as the reservoir. For such service a partition 154 with a suitable filter is placed just below the bottom of the gearing, the space below the partition being the equivalent of the lower tank of the radiator 36. The circulating oil is returned to the space above the partition which corresponds to the upper tank of the radiator; the oil therefore serving the double duty of the circulatory system and of lubricating the gearing.

Any of the various forms of planetary or epicyclic or differential gearing may be used for the herein described purposes and services, the form utilizing the internal gear being readily adaptable for effecting reversal of rotation.

Although I have described several specific embodiments of my invention, it will be obvious to those skilled in the art, that various modifications may be made in the details of construction, the general arrangement, the association of the several co-operating parts and the application of my invention without departing from the spirit thereof or the principles herein set forth.

I claim:

1. An hydraulic gear transmission having means for transforming and transmitting power to its output shaft so as to have the characteristic of infinite graduations of torque for any speed between zero and maximum of said shaft, said means comprising a planetary gearing and an hydraulic circulatory system for controlling the operation of the gearing, said system comprising one or more pressure pumps driven by said gearing for circulating fluid, a reservoir having an opening to atmosphere, valve means including a plurality of three-way valves and a throttle valve for controlling and varying the fluid circulation and the pump pressures, and conduit means for the system, each three-way valve being adapted for by-passing the throttle valve and for diverting the circulating fluid to the reservoir in order to expose said fluid to the atmosphere thereby reducing the pressure of the circulating fluid and eliminating unwanted torque on the output shaft by members of said gearing.

2. An hydraulic gear transmission having power means for transforming and transmitting power to its output shaft so as to have the characteristic of infinite graduations of speed for any torque between zero and maximum of said shaft, said means comprising a planetary gearing and an hydraulic circulatory system for controlling the operation of the gearing, said system comprising a plurality of pressure pumps driven by said gearing for circulating fluid, a reservoir having an opening to atmosphere, conduit means providing a suction path and a plurality of discharge paths between the pumps and the reservoir, and, valve means for controlling and varying the fluid circulation and the pump pressures, said valve means including a throttle valve adapted to close one of the discharge paths and a plurality of three-way valves one of which is a pressure limiting valve, two of the three-way valves being adapted to by-pass the pressure limiting valve and the throttle valve for exposing the circulating fluid to atmosphere thereby causing reduction of the pressure of the circulating fluid to approximately that of atmosphere.

3. An hydraulic gear transmission having means for transmitting to its output shaft, torque and speed having the characteristic of infinite graduations of torque between zero and maximum for any speed including zero speed of said shaft, and of infinite graduations of speed between zero and maximum for any torque on said shaft. said means comprising a planetary gearing and an hydraulic circulatory system for controlling the operation of said gearing, said system having a plurality of positive displacement rotary pumps for circulating fluid, a reservoir having an opening to atmosphere, conduit means, and a plurality of valves for controlling and varying the fluid pressure and circulation and varying the fluid pressure and circulation including a throttle valve for varying gradually the pressure of the circulating fluid thereby to vary gradually the speed and torque of the output shaft, a pressure limiting valve adapted to by-pass the throttle valve upon the attainment of a predetermined overload fluid pressure at the throttle valve thereby causing reduction of said pressure and preventing excessive torque on said output shaft, and two 3-way valves each adapted to by-pass the other valves for exposing to atmosphere the fluid circulating through one of said paths, and, means for operating the two 3-way valves in unison.

4. An hydraulic gear transmission comprising a planetary gearing, and means for applying on a member of the planetary gearing a plurality of equalized and variable restraining forces for varying the speed and the torque of the output shaft of the transmission, said means comprising a gear secured to said member, a circulatory system having a plurality of positive displacement rotary pumps in driven engagement with said gear and operating in parallel for circulating fluid, thereby exerting a corresponding plurality of restraining forces on the gear and said member, conduit means for connecting all of said pumps in common fluid communication and equalizing their respective restraining forces, a reservoir having a vent pipe to atmosphere, and valve means for controlling the circulation of the fluid and varying the pressure of the pumps. thereby controlling and varying said restraining forces on said member and the output shaft, said valve means including a throttle valve, a pressure limiting valve and a pair of 3-way by-passing valves either of said 3-way valves being adapted to by-pass the other valves and the reservoir for exposing said fluid to atmosphere.

5. In mechanism such as a transmission having a rotating member, means for applying a plurality of equalized and variable restraining forces on said member for varying its speed and for allowing it to rotate continuously at any speed for any torque on the member, said means comprising a circulatory system having: a plurality of pumps in driven engagement with the member and operating in parallel for circulating fluid thereby exerting a corresponding plurality of restraining forces on said member, conduit means for connecting all of said pumps in common fluid communication and equalizing their respective restraining forces, a reservoir having an opening to atmosphere, additional conduits providing suction and discharge lines between the first named conduit means and the reservoir, and valve means including a plurality of transfer valves and a throttle valve for controlling and varying the circulation and pressure of the fluid and for diverting the circulating fluid to exposure to atmosphere, thereby to control and vary said restraining forces on said member, one of said transfer valves controlling said suction line and the other valves controlling the discharge lines.

6. An hydraulic gear transmission comprising gearing having a plurality of gear combinations for providing different torque ratios between the input and output shafts of the transmission, and means operative to change the gear combinations upon the attainment of predetermined torque, comprising a plurality of pressure pumps driven by said gearing for circulating fluid, the pressure of at least one of said pumps being higher than that of the other pumps and being proportional to the torque on one of said shafts, and fluid pressure responsive valve means for selectively changing the operation of said pumps upon the attainment of fluid pressure corresponding to said predetermined torque, whereby change of the gear combinations and the torque ratio between said shafts is automatically made.

7. A variable speed and torque transmission comprising: a planetary gearing having plurality of gear combinations of different ratios for transmitting a corresponding plurality of different torques to the output shaft of the transmission, and means operative to change the gear combinations from one ratio to another comprising, a plurality of pressure pumps driven by said gearing for circulating fluid, valve means selectively controlling the operation of said pumps for effecting change of gear combinations, and a throttle valve operative for varying through a wide range by infinite graduations the torque and the speed of the output shaft for any said gear combination.

8. An hydraulic gear transmission, comprising gearing having a plurality of gear combinations for providing different torque ratios between the input and output shafts of the transmission, fluid pressure means for controlling the torque for each said gear combinations and operative independently of the speed variations of either shaft to interchange said gear combinations and torque ratios according to the torque on one of said shafts upon the attainment of predetermined torque, and valve means cooperating with said other means for varying through a wide range by infinite graduation the speed of the output shaft for any said gear combination.

9. In combination, a motor, and a variable gear transmission adapted to drive a work device, said transmission having a plurality of gear combinations for providing different torques ratios between the motor and the work device, and means controlled and operated by the flow of energy to the motor in accordance with the torque load on the motor for changing the gear combinations and torque ratios.

10. In combination a work device and a variable gear transmission adapted to apply retarding and braking force on the work device for slowing down its momentum speed, said transmission comprising: a gearing having two gear combinations of different ratios, and fluid pressure means for causing both combinations to operate gradually at the same time thereby to slow down the speed of the work device, comprising a pair of pressure pumps driven by the gearing, and valve means for throttling the circulation of fluid by both of said pumps.

11. In a transmission, the combination of: a planetary gearing having a plurality of gear combinations for providing different torque ratios between the input shaft and the output shaft of the transmission, means for effecting interchange of said gear combinations, comprising, a fluid circulatory system having a pressure pump for each said gear combination and driven by it, a throttle valve and a pair of transfer valves for controlling the pressure and the volume of the fluid circulated by said pumps, and means for operating said transfer valves to reverse the pressure-volume relations of two of said pumps with respect to each other, thereby changing the gear combination and torque ratio between said shafts.

12. An hydraulic gear transmission, comprising: a planetary gearing having at least two gear combinations for providing different torque ratios between the input shaft and the output shaft of the transmission, and, a fluid circulatory system cooperating with said gearing for interchanging said gear combinations irrespective of speed variations of said shafts said system comprising, a pressure pump for each said gear combination, a plurality of valves for controlling the pressure and the volume of the fluid circulated by said pumps, and means for operating some of said valves to change the pressure-volume delivery of two of said pumps inversely with respect to each other, whereby change of the gear combination and the torque ratio between said shafts is effected.

13. An hydraulic gear transmission, comprising: gearing having at least two gear combinations for providing different torque ratios between the input shaft and the output shaft of the transmission, and, a fluid circulatory system co-operating with said gearing to interchange said gear combinations upon the attainment of predetermined torque comprising a pressure pump for each said gear combination, a plurality of valves for controlling the pressure and the volume of the fluid circulated by said pumps, means for operating some of said valves so as to change the pressure-volume delivery of two of said pumps inversely with respect to each other, and means actuated by the pressure differential of said two pumps for operating the valve operating means upon the attainment of said predetermined torque.

14. In a gear transmission, the combination of: a planetary gearing having two gear combinations of unlike speed-torque ratios, either of which is adapted to transmit power to the output shaft of the transmission, and, hydraulic means for controlling the operation of said gearing, comprising, a pressure pump for each said gear combination and driven by it for circulating a liquid, conduits and a reservoir for said liquid, a valve for throttling or preventing circulation of one of said gear combinations to transmit power to the output shaft, and two 3-way valves either of which is adapted to by-pass the throttle valve, said 3-way valves being operable to interchange the pressure-volume delivery of the two pumps with respect to each other, thereby effecting substitution of one gear combination for the other for transmitting power to the output shaft.

15. An hydraulic gear transmission comprising: a planetary gearing having at least two gear combinations of different ratios for transmitting correspondingly different speed-torques to the output shaft, and, an hydraulic circulatory system co-operating with said gearing for controlling and varying its operation, said system comprising a pressure pump for each said gear combination and driven by it for circulating liquid, a reservoir, conduit means between the pumps and the reservoir providing a suction channel, a high pressure channel and a low pressure channel for said liquid, a three-way transfer valve for each pump, each said valve being adapted to transfer the discharge of its pump from one to the other of said pressure channels, means for operating two of said valves so as to interchange the pressure channels to their respective pumps thereby effecting interchange of the gear combinations to the output shaft, and, a throttle valve in the high pressure line adapted to vary the circulation therethrough, thereby varying by infinite graduations the speed-torque transmitted by the gear combination to the output shaft.

16. In a planetary gearing transmission having a plurality of gear combinations of different ratios for transmitting a like plurality of different torques to its output shaft, the combination therewith, of means for determining and indicating the torque on said shaft, comprising: a pressure pump for each said gear combination and driven by it for circulating liquid, a reservoir, conduit means between the pumps and the reservoir providing a suction channel, a high pressure channel and a low pressure channel, a three-way transfer valve for each pump, each said valve being adapted to transfer the discharge of its pump from one to the other of said pressure channels, a throttle valve in the high pressure channel for varying or preventing the circulation of liquid therethrough, the fluid pressure of said channel being the highest of the circulatory system and proportional to the torque on the output shaft, and a pressure gauge connected to the high pressure channel for measuring and indicating said torque.

17. A transmission comprising: a planetary gearing having a plurality of gear combinations of different ratios for transmitting a like plurality of different speeds and torques to its output shaft, and, an hydraulic circulatory system co-operating with the gearing for automatically changing the gear combination and ratio to the shaft upon the attainment of predetermined torque on said shaft, said system comprising, a pressure pump for each said gear combination and driven by it for circulating a liquid, a reservoir for the liquid, conduit means for the system including a high pressure channel and a low pressure channel for conducting the discharge of said pumps, valve means including a valve in the high pressure channel for throttling or preventing the circulation of liquid therethrough, a pair of transfer valves adapted to direct the discharge of any of said pumps into either of said channels, the fluid pressure in the high pressure channel being proportional to the torque on said output shaft, and means responsive to said pressures and operative to actuate said transfer valves upon the attainment of said predetermined torque thereby to effect change of gear combination and ratio to the output shaft.

18. An hydraulic variable gear transmission, comprising in unitary assembly: a housing, a planetary gearing having an input shaft and an output shaft and a circulatory system for controlling the operation of the gearing said system including a plurality of pressure pumps driven by said gearing for circulating a liquid, a reservoir for the liquid and having an opening to atmosphere, a conduit means, and a valve mechanism having a throttle valve and a plurality of three-way transfer valves for controlling and varying the pressure and the circulation of said liquid for exposing the circulating liquid to atmosphere, one of said three-way valves being a load limiting valve, and two others of said three-way valves having means for operating them in unison.

19. A variable torque transmission, comprising: gearing having a plurality of gear combinations for providing different torque ratios between the input and output shafts of the transmission, means for creating fluid pressure proportional to torque for controlling the torque on said shafts, and, co-operating means responsive to said fluid pressure and operative independently of speed variations of either shaft for automatically effecting change of the gear combinations and the torque ratios in accordance with the torque on one of said shafts, said co-operating means comprising, members movable by said fluid pressure through distances proportionate to said torque, and quick acting members connected to said movable members and operative upon the attainment of predetermined torque to effect said change of the gear combinations and torque ratios.

20. A variable torque transmission, comprising: gearing having a plurality of gear combinations for providing different torque ratios between the input and output shafts of the transmission, pumps and valves for creating fluid pressure proportional to torque for controlling the torque on said shafts, and, co-operating means responsive to and movable by said fluid pressure and operative independently of speed variations of either shaft for automatically effecting change of the gear combinations and the torque ratios in accordance with the torque on one of said shafts, said movable means including a manually operable handle for optionally effecting change of the gear combinations irrespective of torque and of the automatic means.

21. A variable torque transmission, comprising: gearing having a plurality of gear combinations for providing different torque ratios between the input and output shafts of the transmission, pumps and valve means for creating fluid pressure proportional to torque for controlling the torque on one of said shafts, co-operating means responsive to said fluid pressure and operative independently of speed variation of either shaft for effecting change of the gear combinations and the torque ratios upon the attainment of predetermined torque on one of said shafts, and an overload relief valve operative irrespective of speed variation of either shaft and independently of said co-operating means to limit the torque so as to prevent excessive overload torque on said shafts.

22. In combination, a motor and a variable gear transmission adapted to transmit the power of the motor to a work device, said transmission having a plurality of gear combinations for providing different torque ratios between the motor and the work device, fluid pressure creating means including valves, operative for changing said gear combinations and torque ratios, and valve operating means actuated by the energy flow to said motor and operative irrespective of speed variation of the motor or the work device for effecting said change of gear combinations and torque ratios in accordance with the torque load on the motor.

23. In combination, an electric motor and a variable gear transmission adapted to drive a work device, said transmission comprising: a plurality of gear transmissions for providing different torque ratios between the motor and the work device, means including valves for creating fluid pressure operative for changing said gear combinations and torque ratios, electrical means in the energy supply circuits to the motor operative in accordance with the torque on the motor for operating some of said valves to effect said change of the gear combinations and torque ratios upon the attainment of predetermined motor torque, and a valve operated by said electrical means for limiting the torque so as to prevent excessive overload torque on the apparatus without interrupting the operation thereof.

24. In a self-propelled vehicle having an engine, and a drive shaft for the vehicle wheels, the combination therewith of a variable gear transmission adapted to be interposed between the engine and the drive shaft, said transmission comprising: a plurality of gear combinations for providing different torque ratios between the engine and said shaft, and, an hydraulic circulatory system co-operating with said gearing for controlling and varying the operation thereof, said system comprising, pressure pumps and valve means operative automatically to effect change of said gear combinations and the torque ratios upon the attainment of predetermined engine torque, a manually operable lever for optionally effecting change of the gear combinations and torque ratios irrespective of the torque and of the automatic means, said valve means including a manually operable member for varying through a wide range by infinite graduations the speed of the drive shaft for any said gear combination, and said system including a manually operable valve adapted to cause the transmission to apply retarding and braking force on the drive shaft for slowing down the momentum speed of the vehicle independently of any other braking means of the vehicle.

FREDERIC W. HILD.